US012511686B2

(12) United States Patent
Dill et al.

(10) Patent No.: US 12,511,686 B2
(45) Date of Patent: Dec. 30, 2025

(54) REAL-TIME ONLINE TRANSACTIONAL PROCESSING SYSTEMS AND METHODS

(71) Applicant: Fidelity Information Services, LLC, Jacksonville, FL (US)

(72) Inventors: Lisa Dill, Tampa, FL (US); Lauren Morrison, Jacksonville, FL (US); Jeanette Garrett, Jacksonville, FL (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

(21) Appl. No.: 17/103,818

(22) Filed: Nov. 24, 2020

(65) Prior Publication Data

US 2022/0164868 A1 May 26, 2022

(51) Int. Cl.
*G06Q 40/02* (2023.01)
(52) U.S. Cl.
CPC .................................. *G06Q 40/02* (2013.01)
(58) Field of Classification Search
CPC ..... G06Q 40/02; G06F 16/27; G06F 16/2282; G06F 16/2358
USPC ......................................................... 705/35
See application file for complete search history.

(56) References Cited

U.S. PATENT DOCUMENTS

| 7,797,231 B1 | 9/2010 | Loeb et al. |
| 10,706,453 B1 * | 7/2020 | Morin ..................... G06N 20/20 |
| 11,055,692 B1 * | 7/2021 | Bodalia .............. G06Q 30/0633 |
| 2012/0101881 A1 * | 4/2012 | Taylor .................... G06Q 30/04 |
| | | 705/14.36 |

(Continued)

FOREIGN PATENT DOCUMENTS

| CN | 108009819 A | * | 5/2018 | ........... G06Q 20/405 |
| CN | 113272850 A | * | 8/2021 | ............. G06Q 40/03 |
| JP | 2020522832 A | * | 5/2018 | ............. G06Q 40/02 |

OTHER PUBLICATIONS

Title: Could Decision Trees Improve the Classification Accuracy and Interpretability of Loan Granting Decisions? Authors: Jozef Zurada Date: 2010 (Year: 2010).*

(Continued)

*Primary Examiner* — Bennett M Sigmond
*Assistant Examiner* — Yongsik Park
(74) *Attorney, Agent, or Firm* — FINNEGAN, HENDERSON, FARABOW, GARRETT & DUNNER LLP

(57) ABSTRACT

Systems and methods for real time, online transaction processing are disclosed. The system may include one or more memory units storing instructions and one or more processors configured to execute the instructions to perform a method. The method may include receiving, from an event broker, event data that includes account data. The operations may include using a data structure to identify an issuer system associated with the account data and an enrollment status of the issuer system. The method may include generating a filtered transaction data structure to an analyzer and receiving a result data structure. The method may include generating, based on the result data structure, a linked data structure comprising installment loan parameters and an online address. The method may include routing the linked data structure to a user device and receiving approval data that triggers an account allocation.

17 Claims, 5 Drawing Sheets

(56) References Cited

U.S. PATENT DOCUMENTS

| | | | | |
|---|---|---|---|---|
| 2014/0046781 | A1* | 2/2014 | Walker | G07F 17/32 |
| | | | | 705/16 |
| 2016/0140545 | A1* | 5/2016 | Flurscheim | H04L 9/3234 |
| | | | | 705/76 |
| 2017/0270604 | A1* | 9/2017 | Abela | G06Q 40/03 |
| 2020/0074434 | A1* | 3/2020 | Chen | G06Q 20/24 |
| 2020/0160295 | A1* | 5/2020 | Jagalpure | G06Q 20/204 |
| 2020/0349641 | A1* | 11/2020 | Fidanza | G06N 20/00 |
| 2021/0133670 | A1* | 5/2021 | Cella | G06N 3/044 |

OTHER PUBLICATIONS

Written Opinion, dated Feb. 8, 2022, issued by the International Searching Authority in International Patent Application No. PCT/US21/60446 (5 pages).

Serkan Ozal: "Building Blocks for AWS Lambda," Medium, Apr. 27, 2020, p. 1, XP093152428, retrieved from the internet: URL:https://medium.com/@serkan_ozal/building-blocks-for-aws-lambda-ddbda63a2423 (16 pages).

Extended European Search Report for counterpart EP Application No. 21898995.2 dated May 8, 2024.

* cited by examiner

REAL-TIME ONLINE TRANSACTIONAL PROCESSING SYSTEMS AND METHODS

BACKGROUND

Many transactions, including online transactions, are completed using credit cards, debit cards, bill payment systems, or through other mechanisms. Often, a purchaser and a financial services provider may benefit from converting these transactions to installment loans. For example, a purchaser may benefit from spreading out payments and lowering a risk of accumulating expensive revolving credit debt. And a financial services provider may benefit from a reduced risk of non-payment or default while also collecting interest.

But conventional methods for processing transactions often lack automated mechanisms for converting transactions to installment loans. For example, a user (e.g., a person or a business) may execute a transaction to purchase a good or service using a credit card or debit card and be unable to convert the transaction to an installment loan. To convert a transaction to an installment loan, a user may need to initiate a request with a financial service provider by submitting a form, by making a phone call, or by taking other inconvenient approaches.

In addition, financial service providers receive large volumes of transactions associated with many different issuers (e.g., credit card issuers, checking account or debit card issuers, bill payment providers, etc.) and be unable to process these large volumes of transactions efficiently and in real time to determine transactions that may be good candidates for installment loans. Similarly, issuers may wish to offer installment loans to users and transactions meeting eligibility criteria but have no way of identifying or processing transactions until well after a transaction is made.

Therefore, in view of the shortcomings and problems with existing systems and methods, there is a need for automated systems and methods that allow users, financial service providers, and issuers to conveniently and securely convert transactions into installments loans.

SUMMARY

The disclosed embodiments provide systems and methods for real-time online transactional processing. The disclosed embodiments provide enhancements to conventional systems by using specific features of data structures to provide real-time automation through, among other things, automatically triggering the generation of offers upon receipt of transaction event data while likewise triggering account allocations upon acceptance of offers.

The disclosed systems and methods may be implemented using a combination of conventional hardware and software and/or specialized hardware and software, such as a machine constructed hardware and/or hardware programmed specifically for performing functions associated with the disclosed method steps.

In some embodiments, aspects of the disclosed systems and methods may be implemented on one or more cloud services designed to generate (spin-up) ephemeral container instances in response to event triggers, assign one or more tasks to the container instances, and terminate (spin-down) the container instances upon completion of a task. By implementing methods using such cloud services, disclosed systems efficiently provision and resource based on demand and provide security advantages because the ephemeral container instances may be closed and destroyed upon completion of a task. That is, the container instances prevent attempts to access the container while not permitting access from outside using terminals or remote shell tools like SSH, RTP, FTP, or Curl, for example.

Consistent with the present embodiments, a system for real-time, online transactional processing is disclosed. The system may include at least one processor and at least one memory containing instructions that, when executed by the at least one processor, cause the at least one processor to perform a method for real-time, online transactional processing.

Consistent with the present embodiments, a method for real-time, online transactional processing is disclosed. The method may include receiving, from an event broker, event data comprising a transaction data structure that includes account data. The method may include identifying an issuer system associated with the account data based on a comparison of the account data with an enterprise data structure having a normalized schema. The method may include retrieving an enrollment status of the issuer system from the enterprise data structure. The method may also include generating, based on the enrollment status, a filtered transaction data structure comprising filtered transaction data and filtered account data. The method may include transmitting the filtered transaction data structure to an analyzer. The method may further include receiving, from the analyzer, a result data structure associated with the filtered transaction data structure. The method may also include generating, based on the result data structure, a linked data structure comprising installment loan parameters, the filtered transaction data, and an online address. The method may also include routing the linked data structure to a user device. The method may include receiving approval data based on the linked data structure from at least one of the user devices or a system associated with the online address. Furthermore, the method may include triggering an account allocation associated with the installment loan parameters based on the approval data.

Consistent with other disclosed embodiments, non-transitory computer readable storage media may store program instructions, which when executed by at least one processor, perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF THE EMBODIMENTS

Figure 1:
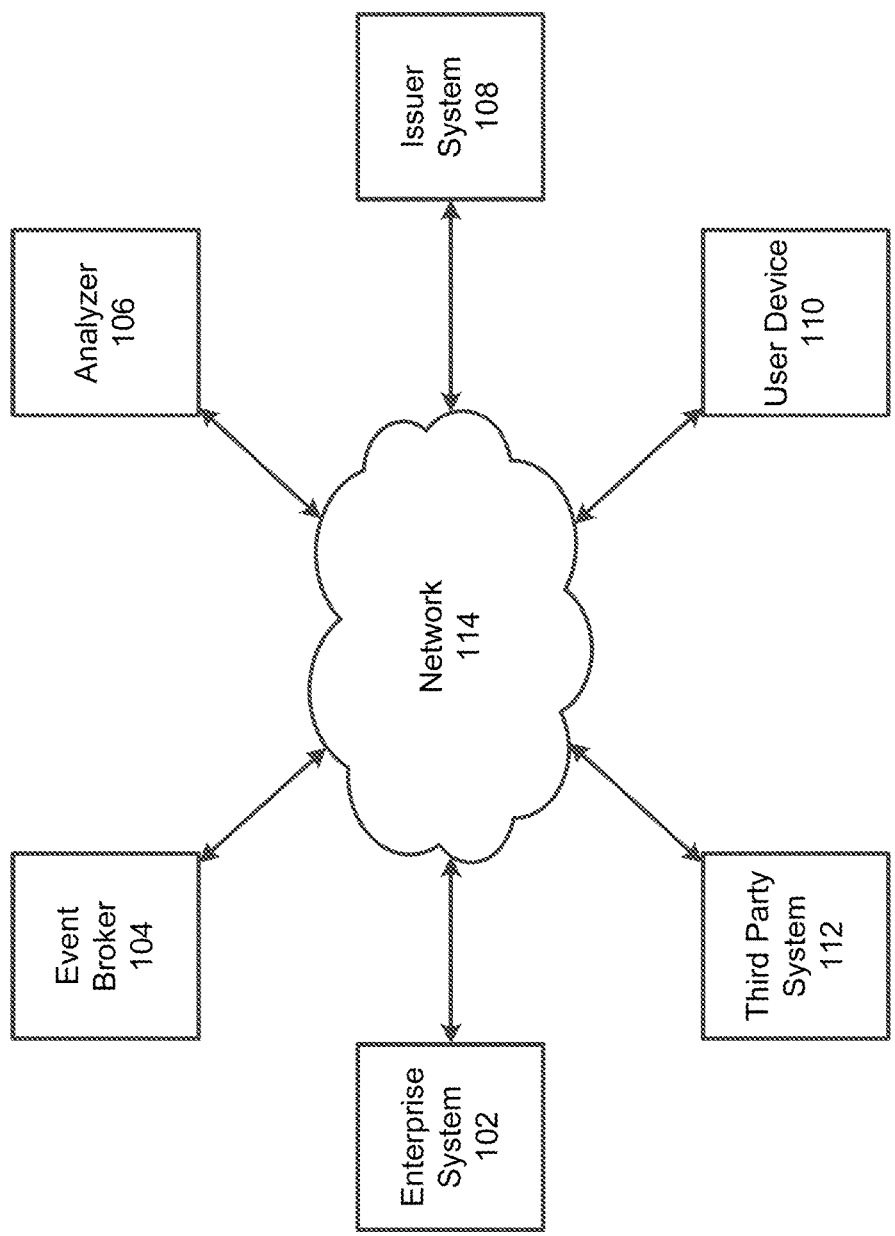
FIG. 1 is a block diagram of an exemplary system for online transactional processing, consistent with disclosed embodiments.

Disclosed embodiments include systems and methods for online transactional processing to improve upon the speed, convenience, and integration between distinct connected computing systems run by different organizations. Reference will now be made in detail to exemplary embodiments, examples of which are illustrated in the accompanying drawings and disclosed herein. Wherever convenient, the same reference numbers will be used throughout the drawings to refer to the same or like parts.

Embodiments may include systems and method for real-time, online transactional processing. For example, a system for real-time transactional data processing may receive an enrollment status of an issuer system. An enrollment status may relate to a financial services provider's participation in a loan conversion program in which transactions may be converted from credit, debit, and/or bill pay transactions into installment loans. An enrollment status may be associated with criteria for determining whether a transaction, account associated with a transaction, and/or consumer, business and/or other user associated with a transaction may be eligible for a loan conversion program. Such criteria may include a minimum or maximum transaction amount, a category of purchase (e.g., a payment for luxury good, payment for an electronic good, a service payment, a utility payment, etc.). An enrollment status may include, among other things, rules for determining eligibility.

An enrollment status may be received from a system associated with a card issuer (e.g., an issuer system) and/or another system associated with a financial services provider. In some embodiments, the enrollment status may be associated with one or more products of an issuer. For example, a credit card issuer may have different products offering different credit card services (e.g., silver, gold, premier, or other classes of credit lines). In some embodiments, an enrollment status may be received via a network, from an event broker (e.g., a system for handling KAFKA events), a socket, or other distributed streaming platform.

A transaction processing system may store a received enrollment status in an enterprise data structure. An enterprise data structure may be a data structure stored on an enterprise system and/or associated with enterprise data. An enterprise data structure may include any type of data structure as disclosed herein.

Consistent with the present embodiments, a data structure of the embodiments may include unstructured data (e.g., ascii files, .txt files) and/or structured data (e.g., xls, event data, key value pairs, and/or other data organized according to a schema). Further, structured data may include semi-structured data (e.g., .csv, email messages, XML, JSON). Data structures may have normalized schema (e.g., an optimized organization of attributes and relations in a database, key value pairs, or other standardized organization) and/or a database model such as a flat model, hierarchical model, relational model, object-relational model, star schema, network model, or other model. As an example, data structures may include a linked data structure having information organized as nodes and references (e.g., links or pointers between nodes). Linked data structures may include tree structures or other relational data structures.

Storing a data structure may include retrieving, indexing, reading, writing, appending, and/or prepending data. Storing a data structure may include updating an existing data structure and/or creating a new data structure. Data structures may be stored in local data storage, networked data storage, cloud data storage and/or any other data storage. Data structures may be stored in databases, including relational databases, clustered databases, and/or other database configurations. Nonlimiting examples of databases of the embodiments may include APACHE CASSANDRA databases, REDIS databases, POSTGRESQL databases, SQL databases, AMAZON RELATIONAL DATABASE, and/or any other database format.

In some embodiments, a system may receive, from an event broker, event data comprising a transaction data structure that includes account data. Event data may include log-structured messages. An event broker may include a system for processing events (e.g., KAFKA events, AMAZON LAMBDA events, or other real-time networked events). An event broker may include a component of a system for real-time transactional data processing. An event broker may include a distributed cloud-computing system. An event broker may include a system with a distributed architecture for processing event streams (e.g., AMAZON LAMBDA service, APACHE KAFKA service, and/or any other distributed architecture). An event broker may be scalable and configured for containerized data processing. In some embodiments, a system may parse received event data to identify a transaction data structure.

A transaction data structure may be associated with a transaction for purchasing a good or service at physical location, an online transaction, a bill pay service transaction, an Automated Clearing House (ACH) debit or credit, and/or any other electronic transaction. A transaction data structure may originate in a third party system (e.g., a merchant system, a point of service device such as a credit card reader, a website, a service provider system and received, and/or other system for processing payments) and be transmitted to an enterprise broker. A transaction data structure may include any type of data structure, as disclosed herein.

Account data may include any data associated with a financial services product or account. For example, it may include an account number, a pseudo-identifier (e.g., a single or multiple-use pseudo-account number), a routing number, a personal identifier of a person or business entity associated with an account (e.g., an account holder or authorized user), a balance, a credit limit, an interest rate, and/or any other data related to the provision of financial services. Account data may be associated with a credit card, a debit card, a bill pay account, a checking account, a savings account, a cash account, an investment account, a line of credit, and/or any other financial services product. Account data may include identifying information related to a financial institution or method of payment (e.g., data indicating whether an account is associated with VISA or MASTERCARD).

A system may identify an issuer system associated with the account data based on a comparison of account data with an enterprise data structure having a normalized schema. An issuer system may include any computing system associated with a financial institution that issues accounts, including accounts associated with a received transaction data structure. An issuer system may be associated with a bank, a credit card provider, an online payment system, and/or any other a financial services provider. In some embodiments, identifying an issuer system may be based on comparing a routing number, an account number, an identification number, a string, and/or any other data included in account data. Identifying an issuer system may be based on identifying a location in a data structure (e.g., an enterprise data structure) associated with stored account data and comparing stored account data with received account data. For example, a system may store information in a data structure indicating that all account numbers beginning with the number "4" are associated with a particular issuer (e.g., a particular credit card provider) and identify an issuer associated with received account data abased on the stored information.

Embodiments may include retrieving an enrollment status of the issuer system from an enterprise data structure. For example, an enterprise system may identify a location in a data structure associated with an enrollment status. The enrollment status may be an enrollment status previously received and stored in an enterprise data structure.

In some embodiments, a system may generate, based on the enrollment status, a filtered transaction data structure comprising filtered transaction data and filtered account data. Filtered transaction data or filtered account data may include masked, stripped, or otherwise scrubbed transaction data or account data to remove confidential or sensitive information. For example, filtered account data may include overwriting a string of account numbers (e.g., overwriting with hashes) while leaving some account numbers unaltered (e.g., account 0123456789 may be replaced with ######6789). Filtered transaction data may remove personal identifiers of a user or other entity included in transaction data (e.g., a purchaser or merchant name, date of birth, and/or address). Generating filtered transaction data or account data may include tokenized data (e.g., using a tokenization system to replace real account numbers with fake tokenized numbers).

A system may transmit filtered transaction data structure to an analyzer. An analyzer may be a computing system configured to determine eligibility of a user for a loan conversion program. An analyzer may be a component of a transaction processing system or a separate system. Additionally or alternatively, an analyzer may include a distributed cloud computing system. An analyzer may be configured to determine whether filtered transaction data is associated with an issuer system having a particular enrollment status. Transmitting filtered transaction data may include transmitting a message comprising transaction data, transmitting a link to the transaction data, transmitting a location in memory associated with filtered transaction data, and/or otherwise enabling an analyzer to receive filtered transaction data. Transmittals may be performed using secure methods (e.g., encryption, authentication, or other data security protocols).

In some embodiments, an analyzer may be configured to apply rules to determine whether a consumer, a business, and/or another user associated with a transaction is eligible for a loan conversion program that converts a transaction into an installment loan. In some embodiments, an analyzer may be configured to determine terms of an installment loan based on information in a received transaction and/or other information (e.g., historical data stored by the analyzer and associated with a user). A rule may be associated with a threshold transaction amount (e.g., a minimum or maximum). In some embodiments, an analyzer may be configured to apply trained machine learning models to determine whether a user should be offered a loan conversion. The models may be trained to determine risk based on historical data.

A system may receive, from the analyzer, a result data structure associated with the filtered transaction data structure. In some embodiments, a result data structure may include information indicating that a user meets criteria to receive an offer to convert a transaction into an installment loan. In some embodiments, a result data structure may include a recommendation for offering a loan conversion, a level of risk associated with offering a loan conversion, and/or other information relating to a loan conversion.

A system may generate, based on the result data structure, a linked data structure. A linked data structure may correspond to a particular offer to convert a transaction into an installment loan. For example, a user may complete a transaction using a payment method, and a system may generate a linked data structure corresponding to the transaction. The same or another user may complete another transaction using the same or a different payment method, and a system may generate another linked data structure corresponding to the other transaction. A linked data structure may include information organized as nodes and references (e.g., links or pointers) such as a tree structure or other relational data structures. A linked data structure may be generated based on user profile data linked to account data in an enterprise data structure.

A linked data structure may include installment loan parameters, filtered transaction data, an online address, instructions for generating an interface at a user device, and/or other information related to a transaction, an account, an issuer, and/or an offer for an installment loan. An online address may be associated with an authentication system associated with an issuer system. Installment loan parameters may include interest rate, term (i.e., a payback period), a payment schedule, and/or other parameters characterizing a loan. Installment loan parameters may be retrieved based on an identifier of an issuer system, an identifier of a user associated with account data, and/or other information associated with loan parameters in a data structured (e.g., an enterprise data structure). In some embodiments, generating the linked data structure may include generating the installment loan parameters based on the account data and a rule associated with the issuer system. For example, an interest rate may be generated based on an account balance.

A linked data structure may include information related to multiple installment loan offers for a transaction. Nodes and pointers of a linked data structure may relate to different sets of loan parameters. For example, a first set of nodes and pointers may be associated with a first loan at a first rate, first down payment, first term, and first payment schedule, while a second set of nodes and pointers may be associated with a second rate, second down payment, second term, and second payment schedule.

A system may route the linked data structure to a user device. The user device may be associated with an account that is associated with a received transaction data structure. Routing the linked data structure may include retrieving or otherwise determining a destination based on received transaction data structure (e.g., based on account data) and transmitting a linked data structure to the destination. For example, an enterprise system may store information associating user devices and accounts, and routing may be based on the stored information. Routing may be performed by, for example, sending an email, transmitting a push notification, sending a text message, or sending a message comprising instructions to generate an alert to an app associated with the user device, or any other means of electronic communication.

A system may receive approval data based on the linked data structure from at least one of the user device or a system associated with the online address. Approval may include any information indicating accepting of a loan conversion offer. Approval may be received in a secure communication (e.g., via encryption). Approval maybe be based on user input at a user device. Approval data may include information authenticating a user (e.g., a password, a token, or other authentication data). A system associated with the online address may include an issuer system (e.g., an online address may be on an issuer's website and/or hosted by an issuer system).

A system may trigger an account allocation associated with the installment loan parameters based on the approval data. Triggering an account allocation may include crediting a balance (e.g., crediting a credit card, a checking account, or other account) and generating an installment loan account for an amount that is based on the credited balance. As a nonlimiting example, approval data associated with a $500 credit card purchase of clothing may trigger an account allocation that credits the credit card by $500 and generates an installment loan account having a starting balance of $500. Triggering an account allocation may include sending instructions to an issuer system that an offer has been approved, sending a payment to an issuer system and creating an installment loan associated with an enterprise system, and/or other actions to allocate funds consistent with the present embodiments. Triggering an account allocation may include updating an enterprise data structure (e.g., by updating it to include information related to the account allocation).

FIG. 1 is a block diagram of an exemplary system 100 for online transactional processing, consistent with disclosed embodiments. System 100 may include an enterprise system 102, an event broker 104, and analyzer 106, an issuer system 108, a user device, 110, a third party system 112, and/or other components not depicted in FIG. 1. Components of system 100 may be connected to each other through a network 114.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of enterprise systems, event brokers, analyzers, issuer systems, user devices, third party systems, or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Referring to FIG. 1, enterprise system 102 may be configured to for real-time online transaction processing by, for example, receiving transaction data, processing transaction data, generating loan conversion offers, and triggering account allocations. Enterprise system 102 may include one or more memory units and one or more processors configured to perform operations consistent with disclosed embodiments. In some embodiments, enterprise system 102 may include hardware, software, and/or firmware modules. In some embodiments, some or all components of enterprise system 102 may be installed in a single device, such as a user device or a client device. In some embodiments, some or all components of enterprise system 102 may be hosted on one or more servers, one or more server clusters, or one or more cloud services (e.g., MICROSOFT AZURE, AMAZON AWS LAMBDA, MICROSOFT COGNITIVE SERVICES, ORACLE CLOUD, GOOGLE CLOUD FUNCTIONS, APACHE OPENWHISK, or the like).

Event broker 104 may be configured for scalable event-driven processing using a distributed architecture. Event broker 104 may be configured to receive data associated with hundreds, thousands, millions, or any number of transactions per second from a large number of sources and pass these data to an enterprise system. Event broker 104 may be configured for load balancing services and may have built in redundancies to redirect data when one or more instances of a service fails. Event broker 104 may include one or more memory units and one or more processors configured to perform operations consistent with disclosed embodiments. In some embodiments, event broker 104 may include hardware, software, and/or firmware module. Event broker 104 may include an APACHE KAFKA platform, an AMAZON KINESIS platform, an AMAZON LAMBDA platform, an APACHE SPARK platform, a REDIS and/or other distributed cloud platform for large-scale data processing.

Analyzer 106 may be configured to analyze transaction data and generate information related to a loan conversion program offer, including a recommendation to make an offer, data indicating that offer criteria have been met, credit risk data, and/or other information. Analyzer 106 may be configured to store and implement rules, such as thresholding rules. Analyzer 106 may be configured to train and/or implement machine learning models (e.g., neural network models) to generate loan offer data based on transaction data and/or account data. Analyzer 106 may include one or more memory units and one or more processors configured to perform operations consistent with disclosed embodiments. Analyzer 106 may include a computer, a server, a server cluster, a cloud based service a distributed computing platform, and/or any other computing device.

Issuer system 108 may be associated with a bank, a credit card provider, an online payment system, and/or any other financial services provider. Issuer system 108 may include one or more memory units and one or more processors configured to perform operations consistent with disclosed embodiments. Analyzer 106 may include a computer, a server, a server cluster, a cloud based service, a distributed computing platform, and/or any other computing device.

User device 110 may include a mobile device, a smartphone, a tablet, a personal computer, a card device, a specialized device configured to perform methods according to disclosed embodiments, and/or any other computing device. User device 110 may include one or more memory units and one or more processors configured to perform operations consistent with disclosed embodiments. User device 110 may be associated with an account (e.g., a credit card account).

System 100 may include third-party system 112. Third-party system 112 may be associated with a merchant, an online seller, a bank, a financial service provider, and/or any other organization that may participate in a transaction. Third-party system 112 may include one or more memory units and one or more processors configured to perform operations consistent with disclosed embodiments. Third-party system 112 may include one a personal computing device, a point of service device (e.g., a credit card reader), a computer, a tablet, a mobile phone, a server, a cluster, a cloud based system, and/or any other computing device.

As shown in FIG. 1, at least one of enterprise system 102, event broker 104, analyzer 106, issuer system 108, user device, 110, or third party system 112 may connect to network 114. Network 114 may be a public network or private network and may include, for example, a wired or wireless network, including, without limitation, a Local Area Network, a Wide Area Network, a Metropolitan Area Network, an IEEE 802.11 wireless network (e.g., "Wi-Fi"), a network of networks (e.g., the Internet), a land-line telephone network, or the like. In some embodiments, network 114 may be a secure network and require a password or other authentication criterion to access the network.

Figure 2:
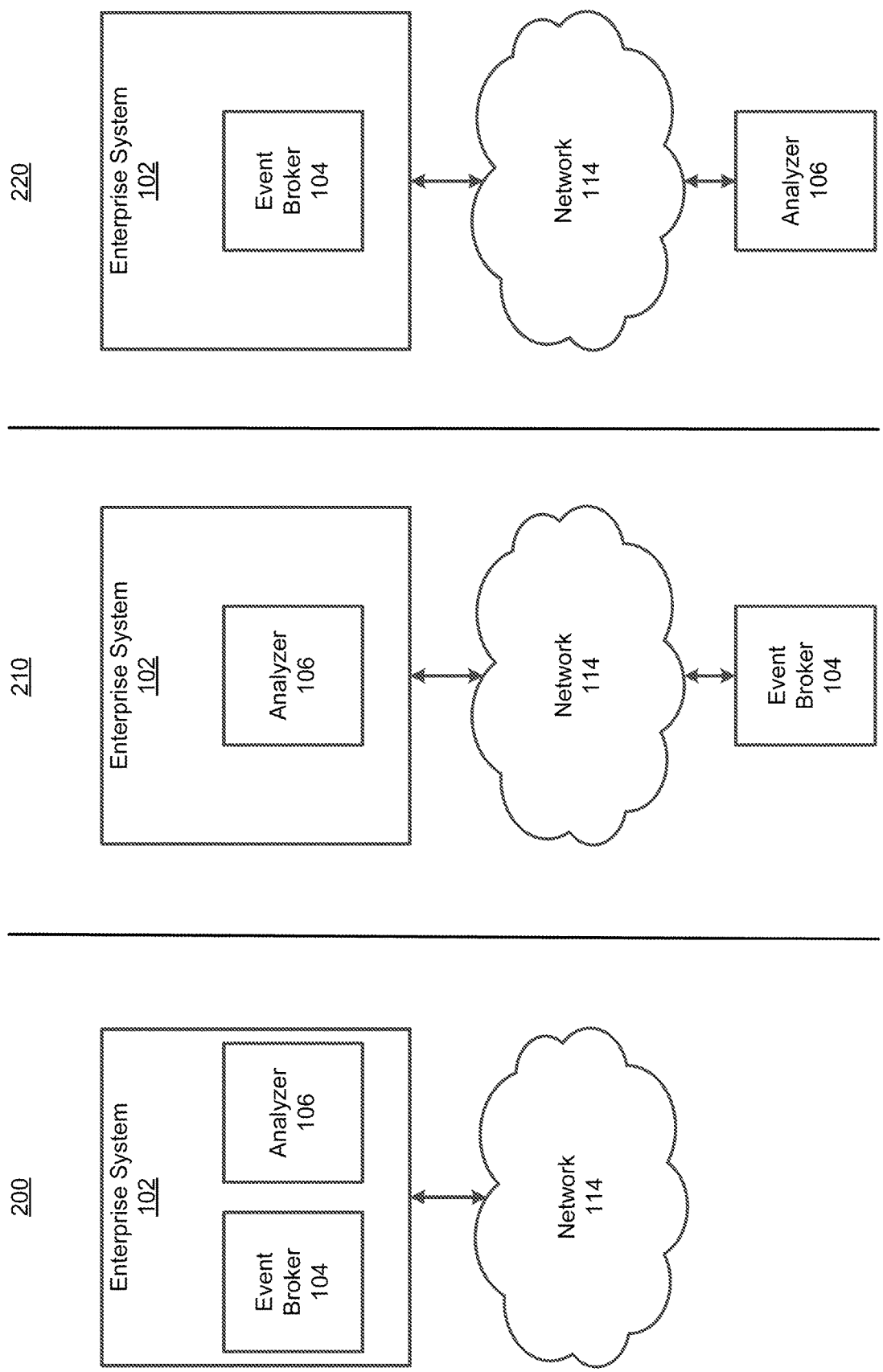
FIG. 2 is a block diagram of exemplary systems for online transactional processing, consistent with disclosed embodiments.

FIG. 2 is a block diagram of exemplary system configurations 200, 210, and 220 for online transactional processing, consistent with disclosed embodiments. Exemplary systems 200, 210, and 220 may be instances of system 100.

Although exemplary system configurations 200, 210, and 220 only depict enterprise system 102, event broker 104, analyzer 106, and network 114, it should be understood that other components not depicted (e.g., issuer system 108) may be included in exemplary systems exemplary systems 200, 210, and 220. Further, configurations of exemplary systems 200, 210, and 220 are provided by way of example only and are not limiting on the embodiments One of skill in the art would appreciate that still other configurations not depicted may be consistent with the present disclosure.

In configuration 200, enterprise system 102 includes event broker 104 and analyzer 106. As shown, enterprise system 102 is connected to network 114 in configuration 200.

In configuration 210, enterprise system 102 includes analyzer 106, while event broker 104 is a separate system. Here, enterprise system 102 and event broker 104 are connected to network 114 in configuration 210.

In configuration 220, enterprise system 102 includes event broker 104, while analyzer 106 is a separate system. Meanwhile, enterprise system 102 and analyzer 106 are connected to network 114 in configuration 210.

Figure 3:
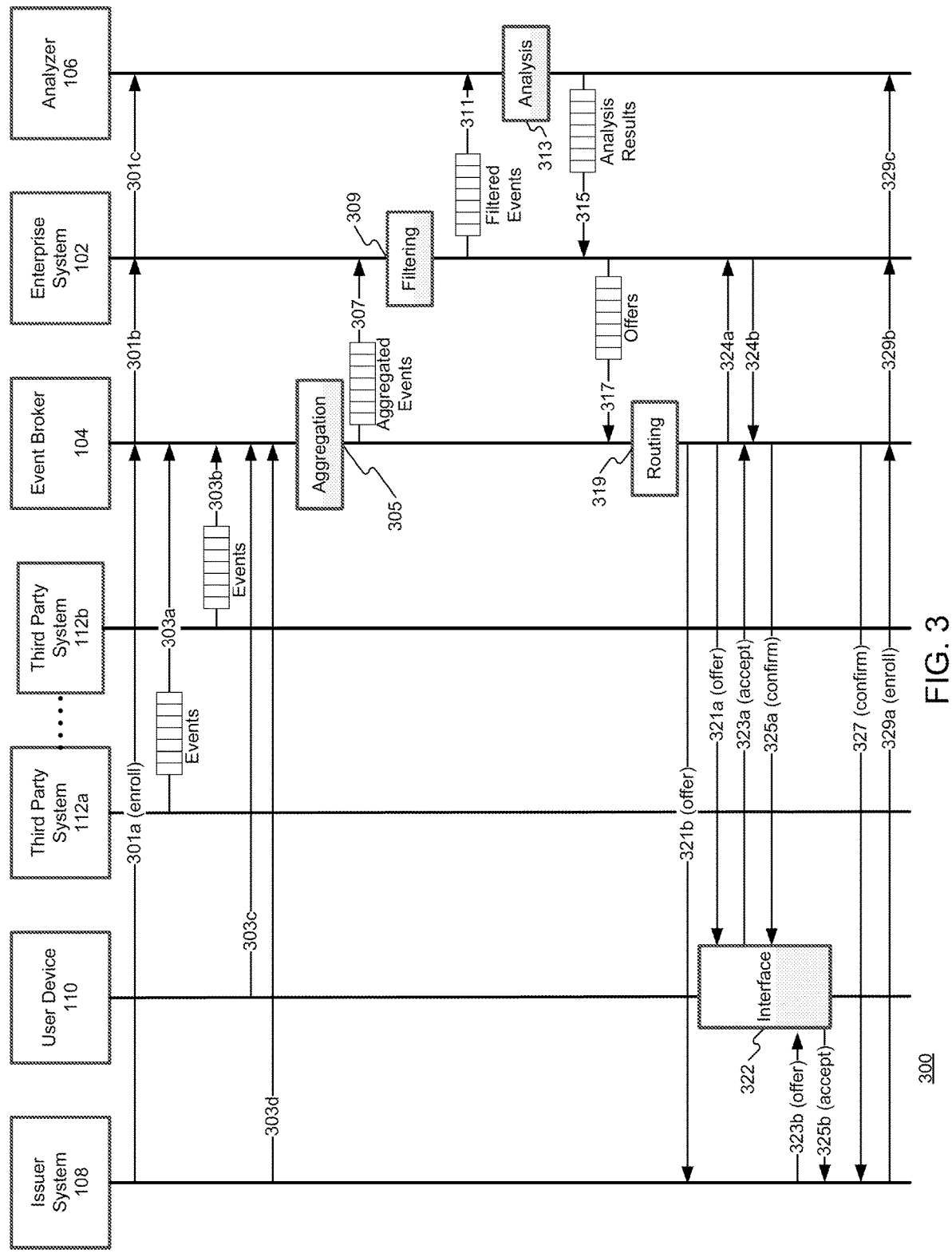
FIG. 3 is flow chart of an exemplary online transactional processing method, consistent with disclosed embodiments.

FIG. 3 is flow chart of an exemplary online transactional processing method 300, consistent with disclosed embodiments. Although FIG. 3 depicts certain components performing steps of process 300, it should be noted that other components of system 100 may perform operations of one or more steps of process 300. In some embodiments, one or more steps of process 300 and process 400 may be part of a same process.

Consistent with disclosed embodiments, steps of process 300 may be performed on one or more cloud services using one or more ephemeral container instances (e.g., AMAZON LAMBDA). For example, at any of step of process 300, a component may generate (spin up) an ephemeral container instance to execute a task, assign a task to an already-running ephemeral container instance (warm container instance), or terminate a container instance upon completion of a task. As one of skill in the art will appreciate, steps of process 300 may be performed as part of an application interface (API) call.

At step 301a, issuer system 108 may transmit enrollment status data to event broker 104, consistent with disclosed embodiments. Enrollment status data may relate to an issuer's participation in a loan conversion program, as previously disclosed. Event broker may forward enrollment status data to enterprise system 102 (step 301b), which may forward enrollment status data to analyzer 106 (step 301c). Analyzer 106 may store received enrollment status data in a data structure, consistent with disclosed embodiments. In some embodiments not shown, issuer system 108 may transmit enrollment status data to enterprise system 102 (i.e., skipping step 301b) or may transmit enrollment status data to analyzer 106 (i.e., skipping steps 301b and 301c).

At step 303a and 303b, exemplary third party systems 112a and 112b generate event data and transmit the event data to event broker 104. Third party systems 112a and 112b may be examples of third party systems 112, as previously disclosed. Further, although FIG. 3 depicts two example third party systems, it should be understood that process 300 may include any number of third party systems that generate respective event data and transmit the event data to event broker 104. Event data may be associated with one or more transactions. As disclosed herein, event data may include transaction data structure and/or log-structured messages. Event data may include, for example KAFKA event data. Event data may include transaction data (e.g., a transaction data structure), user profile data, account data, and/or any other information related to a transaction.

Alternatively or additionally, at step 303c, user device 110 may transmit event data to event broker 104. In some cases, user device 110 may receive user input selecting a transaction to convert to an installment loan (e.g., via interface 322, as describe in greater detail below). For example, a user device may display transactions, payment history, account statements, or other data at an interface and enable a user to select one or more transactions to initiate a process for converting transactions to installment loans. The interface may be part of a mobile application or a webpage viewable in a browser, and it may include radio buttons, check boxes, drop down menus, or other means to enable a user to select transactions. The interface may be associated with a credit card account, a debit account (e.g., a checking account) or other type of account. Further, user device 110 may transmit event data comprising information related to the selected transactions. As disclosed, event data may include information identifying a user, a transaction, an account, or other data that analyzer 106 may use to determine eligibility for loan conversion. In some examples (not shown), step 303c includes transmitting event data to enterprise system 102 and step 303c is followed by step 309, or step 303c includes transmitting event data to analyzer 106 and step 303c is followed by step 313.

At step 305, event broker 104 may aggregate received event data, consistent with disclosed embodiments. Aggregation may include merging, appending, writing, or otherwise modifying event data. Aggregation may include identifying and removing duplicates (e.g., a point of service system and a merchant server system may transmit duplicate events relating to the same transaction to an event broker). Step 305 may include aggregating data received in one or more of steps 303a, 303b, 303c, and 303d. At step 307, event broker may transmit aggregated events to enterprise system 102, consistent with disclosed embodiments. In some embodiments, step 307 may include forwarding events 303a and/or 303b upon receipt without aggregation. In some embodiments, step 307 includes forwarding aggregated events on a schedule (e.g., hourly, daily, and/or at any frequency).

At step 309, enterprise system 102 may filter event data, consistent with disclosed embodiments. Filtering event data may include generating filtered transaction data and/or filtered account data, consistent with disclosed embodiments. Filtering may include masking and/or removing sensitive data, as disclosed herein. At step 311, enterprise system 102 may transmit filtered events to analyzer 106, consistent with disclosed embodiments.

At step 313, analyzer 106 may analyze received filtered event data, consistent with disclosed embodiments. Analyzing at step 313 may include applying rules and/or implementing a machine learning model, consistent with disclosed embodiments. For example, analyzer 106 may analyze event data to determine whether a transaction or a user is eligible for an installment loan based on enrollment status, transaction data, and/or account data. Analyzing at step 313 may include identifying an issuer system and an enrollment status of an issuer system based on transaction data and/or account data. Analyzing may include generating analysis results, the analysis results including a recommendation, an indication of whether a transaction satisfies criteria, and/or other information related to a loan conversion offer. At step 315, analyzer 315 transmits analysis results to enterprise system 102.

At step 315, enterprise system generates offer data (e.g., a linked data structure as previously described) based on the analysis results and transmits offer data to event broker 104 (step 317), consistent with disclosed embodiments. Offer data may include loan parameters an online address, and/or other information related to a loan offer. In some embodiments, enterprise system 102 identifies a destination based on a stored enterprise data structure (e.g., by identifying a user associated with an account or transaction and by retrieving destination information based on the identified user). Enterprise system 102 may forward destination information to event broker 104 at step 317 as part of offer data or separately from offer data.

At step 319, event broker 104 routes one or more offers, consistent with disclosed embodiments. Routing may include determining a destination for forwarding offer data. For example, based on information received from event broker, such as an email address, event broker 104 may identify a destination. A destination may include a user device (step 321*a*) or an issuer system (step 321*b*). Although only one user device and issuer system are depicted in FIG. 3, it should be understood that any number of user devices or issuer systems may be included at steps 321*a* and 321*b*.

In some embodiments, following receipt of offer data at step 321*a*, user device 110 may send acceptance data or rejection data to event broker 104 (step 323*a*), which may forward acceptance data to enterprise system 102 (step 324*a*). Enterprise system 102 may trigger an account allocation and transmit confirmation in return (step 324*b*) to event broker 104, which forwards the confirmation to user device 110 (step 325*a*). Alternatively or additionally, at step 327, event broker 104 may forward confirmation data and/or acceptance data to issuer system 108. Issuer system 108 may execute an account allocation in response to the received confirmation data or acceptance data.

In some embodiments, following receipt of offer data at step 321*b*, issuer system 108 may transmit the offer data to user device 110 (step 323*b*). User device 110 may send acceptance data or rejection data to issuer system 108 (step 325*b*). Following receipt of acceptance data at step 325*b*, issuer system 108 may trigger an account allocation, consistent with disclosed embodiments.

In some embodiments, following receipt of acceptance data at step 325*b* or upon receipt of acceptance data or confirmation data at step 327, issuer system 108 may update an enrollment status by transmitting an enrollment status update to event broker 104 (step 329*a*), which may forward the update to enterprise system 102 (step 329*b*), which may forward the update to analyzer 106 (step 329*c*). Analyzer 106 may update a stored data structure based on updated enrollment status data. In some embodiments not shown, issuer system 108 may transmit updated enrollment status data to enterprise system 102 (i.e., skipping step 329*b*) or may transmit enrollment status data to analyzer 106 (i.e., skipping steps 329*b* and 329*c*).

As shown, process 300 may involve interface 322 at user device 110 to facilitate the exchange of information at any of steps 321*a*, 323*a*, 325*a*, 323*b*, or 325*b*. Interface 322 may include an application (e.g., a mobile application) associated with an account or an issuer. For example, interface 322 may include a credit card portal, a debit card or banking account portal, a mobile app, a browser, or any other software package configured to provide offers for installment loans, receive user inputs accepting or rejecting the offers, and to display confirmation of approved loans. In some embodiments, interface 322 includes a messaging service for exchanging messages via SMS, email, IMESSAGE, GOOGLE CHAT, WHATSAPP, or other platforms for exchanging messages.

Figure 4:
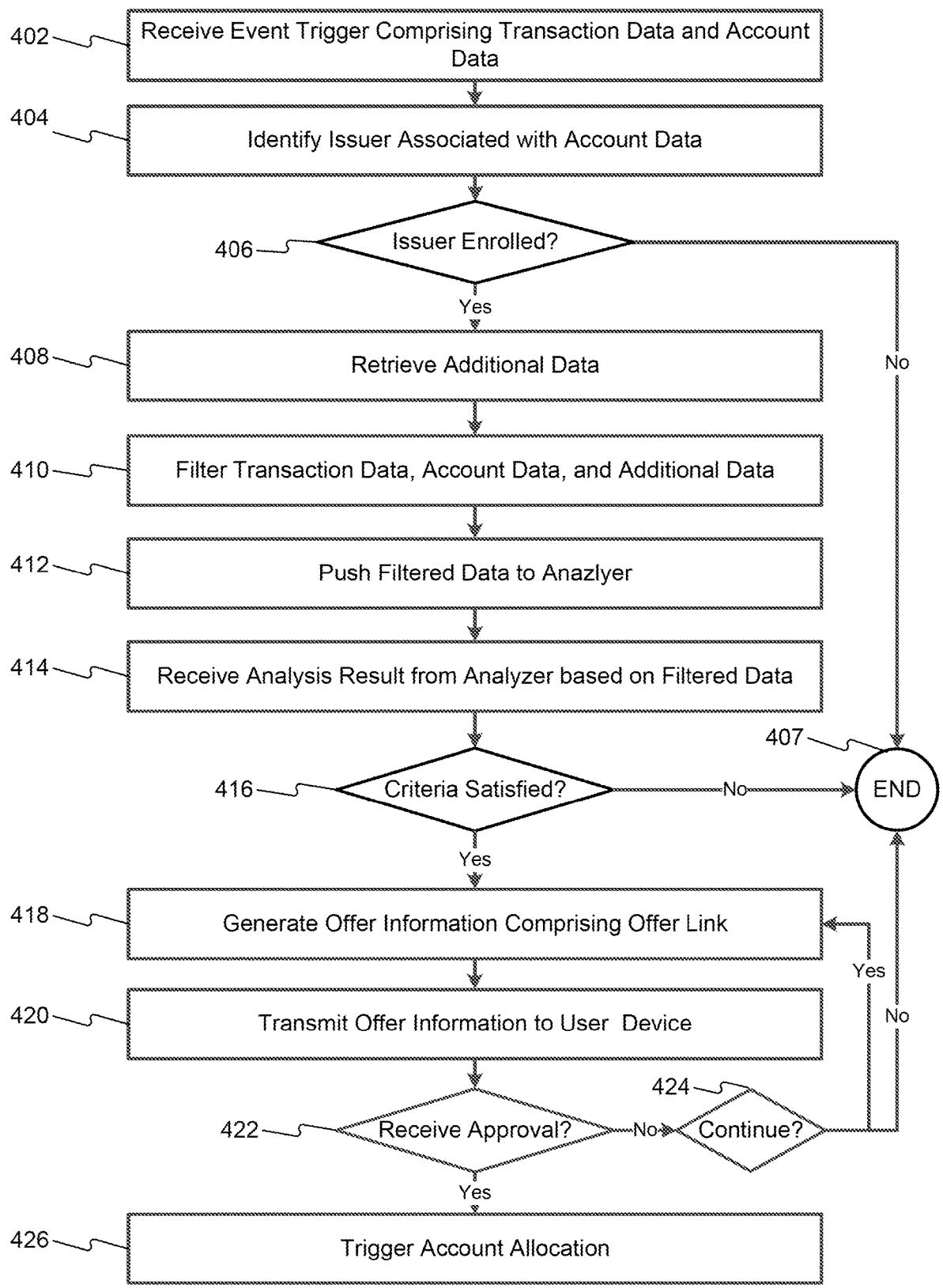
FIG. 4 is flow chart of an exemplary online transactional processing method, consistent with disclosed embodiments.

FIG. 4 is flow chart of an exemplary online transactional processing method 400 (i.e., process 400), consistent with disclosed embodiments. Although FIG. 4 may be described with certain components performing steps of process 400, it should be noted that other components of system 100 may perform operations of one or more steps of process 400. In some embodiments, one or more steps of process 300 and process 400 may be part of a same process.

Consistent with disclosed embodiments, steps of process 400 may be performed on one or more cloud services using one or more ephemeral container instances (e.g., AMAZON LAMBDA). For example, at any of step of process 400, a component may generate (spin up) an ephemeral container instance to execute a task, assign a task to an already-running ephemeral container instance (warm container instance), or terminate a container instance upon completion of a task. As one of skill in the art will appreciate, steps of process 400 may be performed as part of an application interface (API) call.

At step 402, enterprise system 102 may receive an event trigger comprising transaction data structure, consistent with disclosed embodiments. A transaction data structure may include transaction data and/or account data.

At step 404, enterprise system 102 may identify an issuer associated with the account data, consistent with disclosed embodiments.

At step 406, enterprise system 102 may determine whether the issuer is enrolled in a loan conversion program, consistent with disclosed embodiments. If an issuer is not enrolled, process 400 may end (step 407) following step 406. If an issuer is enrolled, process 400 may proceed to step 408.

At step 408, enterprise system 102 may retrieve additional data, consistent with disclosed embodiments. Retrieving additional data may include retrieving data from an enterprise data structure, consistent with disclosed embodiments. Additional data may include an enterprise data structure. Additional data may include an issuer identifier, account data, user profile data (e.g., a user identifier, credit score data, and/or any other data relevant to an installment loan offer or a transaction. Additional data may include criteria for offering installment loans, the criteria being associated with an enrolled issuer.

At step 410, enterprise system 102 may filter transaction data, account data, and additional data. Filtering at step 410 may include masking, anonymizing, tokenizing, and/or implementing any other method of managing sensitive data for confidentiality.

At step 412, enterprise system 102 may push filtered data to analyzer 106, consistent with disclosed embodiments.

At step 414, enterprise system 102 may receive, from analyzer 106, analysis results based on filtered data, consistent with disclosed embodiments. Analysis results may include a recommendation for a loan conversion, an indication that a transaction satisfies a criterion, or other analysis results as disclosed herein.

At step 416, enterprise system 102 may determine whether installment loan criteria are satisfied. Step 416 may include identifying information in received analysis results that indicates that installment loan criteria are satisfied. Step 416 may include comparing analysis results to criteria (e.g., comparing a risk level received as an analysis result to a threshold risk level).

If installment loan criteria are not satisfied, process 400 may end (step 407) following step 406. If installment loan criteria are satisfied, process 400 may proceed to step 418.

At step 418, enterprise system 102 may generate offer information comprising an offer link, consistent with disclosed embodiments. Generating offer information may include generating a linked data structure, as disclosed herein. Generating offer information may include generating a link unique to a user and/or transaction. Generating offering information may include identifying loan parameters and including identified loan parameters in the offer information. Offer information may include instructions to generate an interface on a user device.

At step 420, enterprise system 102 may transmit offer information to user device 110, consistent with disclosed embodiments. In some embodiments, offer information may include instructions to generate an interface (e.g., interface 322), and user device 110 may generate the interface based on the instructions following step 420. The interface may include features that enable a user to indicate approval (i.e., acceptance of an offer), to select and approve one of multiple installment loan offers, and/or otherwise interact with a user device (e.g., via an app).

At step 422, enterprise system 102 may determine whether approval (i.e., acceptance) is received, consistent with disclosed embodiments. If approval is not received, process 400 may proceed to step 424 and determine whether to continue. If enterprise system 102 determines to continue at step 424 ("Yes"), then process 400 may return to step 418 and generate new offer information comprising a new offer link (e.g., based on a user refusal, enterprise system 102 may generate a new offer with different loan parameters than an initial offer). If the system determines not to proceed at step 424 ("No"), then process 400 may end (step 407).

If approval is received at step 422, process 400 may proceed to step 426. At step 426, enterprise system 102 may trigger an account allocation, as previously disclosed.

Figure 5:
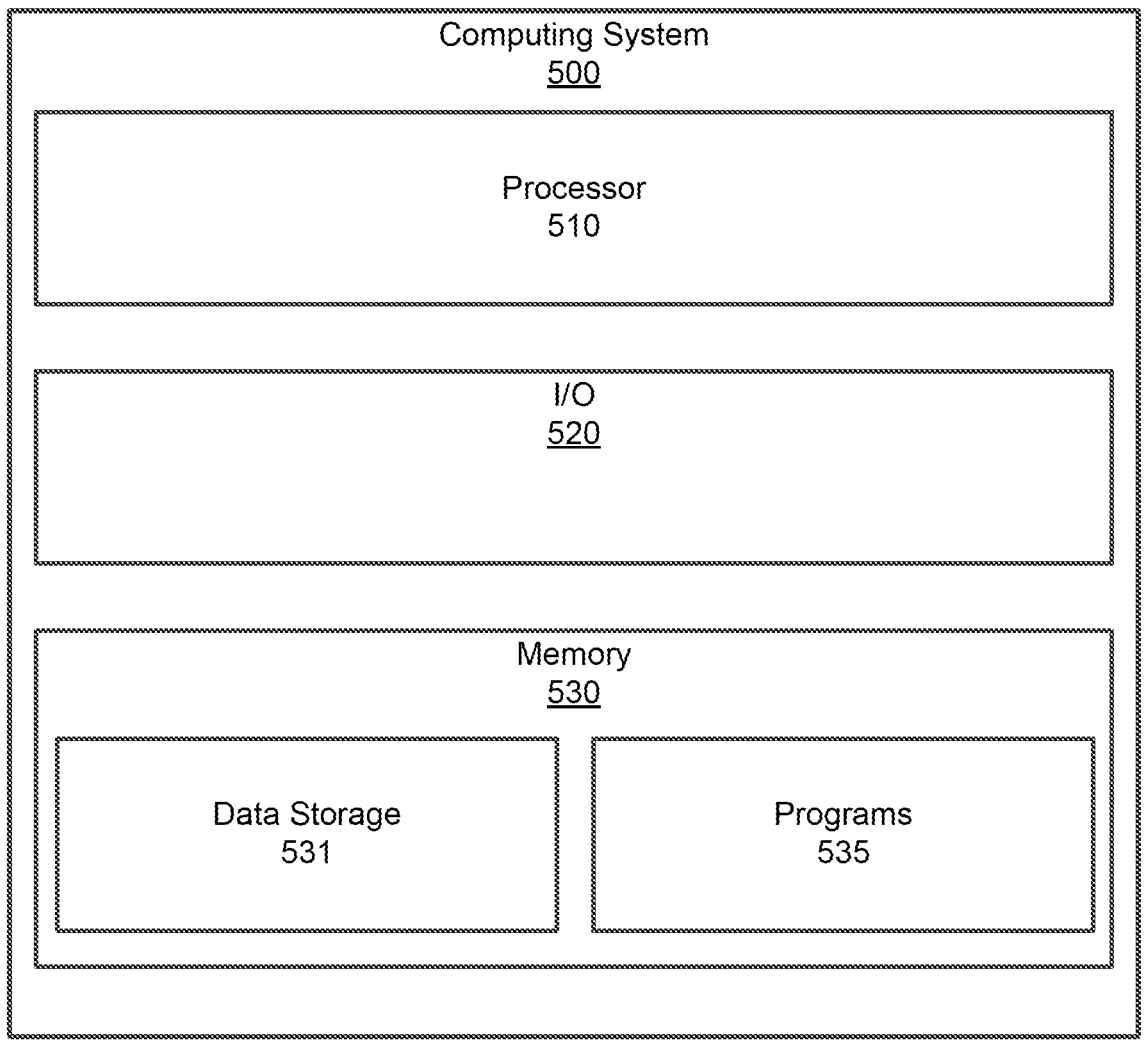
FIG. 5 illustrates an exemplary computing system, consistent with disclosed embodiments.

FIG. 5 illustrates an exemplary computing system 500, consistent with disclosed embodiments. By way of example, computational device 500 or a similar computational device may be used to implement any of the components, devices, or systems described herein (e.g., aspects of systems 100).

The components in computational device 500 are provided for purposes of illustration. Computational device 500 may include, for example, a processor 510, input/output (I/O) units 520, and/or a memory 530. Computational device 500 may include one or more of each component, it may include only some of these components, and it may include other components not depicted in FIG. 5. It is contemplated that additional arrangements, number of components, and/or other modifications may be made to the disclosed computational device 500, consistent with the present disclosure.

Processor 510 may be, for example, a computing processor. Processor 510 may be configured to provide cloud services, consistent with disclosed embodiments. In some embodiments, processor 510 is a microprocessor. Processor 510 may be, for example, a single-core processor or a multiple-core processor (e.g., dual core, quad core). In some embodiments, processor 510 includes a single-core processor configured with virtual processing technologies. In some embodiments, processor 510 may include logical processors to simultaneously execute and control multiple processes. Processor 510 may implement technologies such as virtual-machine technologies to execute, control, run, manipulate, and/or store multiple processes, applications, and/or programs. In some embodiments, processor 510 may include a multiple-core processor configured to provide parallel processing functionalities for execution of multiple processes simultaneously. Processor 510 may be configured, for example, to execute one or more instructions stored in memory 530 to perform operations.

I/O units 520 may include any input and/or output device. For example, I/O units 520 may include a sensor, an input user device, an output user device, a keyboard, a mouse, a track pad, a display, a speaker, a microphone, a battery, a transceiver, and/or any other input or output device. In some embodiments, a device of I/O units 520 may be part of computational device 500. In some embodiments, a device of I/O units 520 may be part of a different device that may be connected to computational device 500. In some embodiments, I/O 520 may include components for receiving inputs and/or generating and displaying an interface (e.g., interface 322).

In some embodiments, memory 530 may include one or more programs 535 (e.g., modules, codes, scripts, software, and/or algorithms). In some embodiments, a program is written in one or more programming languages and/or scripting languages. In some embodiments, a program may be implemented and/or replicated as firmware or circuit logic. In some embodiments, a program collects data via I/O unit 520. Programs may be configured to perform any of the methods described herein.

In some embodiments, memory 530 may include data storage 531. In some embodiments, data stored in data storage may be encrypted and/or unencrypted. In some embodiments, data stored in data storage may be collected using I/O unit 520 and/or receive from another computing device. In some embodiments, data may include a scalable data store, consistent with disclosed embodiments. In some embodiments, data may include one or more databases comprising an organized or structured collection of tables, queries, objects, schema, reports, and/or views.

Systems and methods disclosed herein involve unconventional improvements over conventional transaction processing systems. As compared to conventional technologies, the disclosed embodiments may improve convenience, computational abilities, and/or cross-platform compatibility.

Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for real-time, online transactional processing, comprising:
    at least one processor; and
    at least one memory containing instructions that, when executed by the at least one processor, cause the at least one processor to perform a method comprising:
        receiving, from an event broker comprising a distributed cloud computing system, event data comprising a transaction data structure that includes account data;
        generating an ephemeral container instance;
        performing, using the container instance:
            identifying an issuer system associated with the account data based on a comparison of the account data with an enterprise data structure having a normalized schema;
            retrieving an enrollment status of the issuer system from the enterprise data structure;
            retrieving additional data including an identifier of the issuer system and an identifier of a user associated with the account data;
            aggregating, via the event broker, the enrollment status, the identifier of the issuer system, and the identifier of the user associated with the account data into an aggregated data structure;
            generating, based on the aggregated data structure, a filtered transaction data structure comprising filtered transaction data and tokenized account data;
            transmitting, using encryption, the filtered transaction data structure to an analyzer;
            receiving, from the analyzer, machine learning model output comprising a result data structure associated with the filtered transaction data structure;
            wherein the analyzer trains neural network models to generate the result data structure;
            generating, based on the result data structure and on user profile data linked to the account data in the enterprise data structure, a linked data structure comprising parameters, the filtered transaction data, and an online address, wherein generating the linked data structure further comprises retrieving the parameters based on the identifier of the issuer system and the identifier of the user associated with the account data, wherein the linked data structure comprises multiple nodes and pointers and sets of parameters, wherein each node and pointer relate to a set of parameters, and wherein the linked data structure comprises instructions for generating an interface at the user device;
            routing the linked data structure to a user device of the user, the routing comprising retrieving a destination from the enterprise data structure based on the account data, and transmitting the linked data structure to the destination;
            receiving an encrypted communication comprising approval data based on the linked data structure from at least one of the user device or a system associated with the online address; and
            triggering an account allocation using the tokenized account data associated with the parameters based on the approval data, the account allocation comprising sending a payment to the issuer system or crediting a balance associated with the issuer system; and
        after triggering the account allocation, terminating the ephemeral container instance.

2. The system of claim 1, wherein the event data comprises log-structured messages.

3. The system of claim 1, wherein the operations further comprise parsing the event data to identify the transaction data structure.

4. The system of claim 1, wherein the normalized schema comprises key value pairs.

5. The system of claim 1, wherein the event broker is a component of the system for real-time transactional data processing.

6. The system of claim 1, wherein generating the filtered transaction data structure comprises at least one of stripping sensitive data or masking sensitive data.

7. The system of claim 1, wherein the analyzer comprises a distributed cloud-computing system.

8. The system of claim 1, wherein routing the linked data structure to the user device comprises at least one of sending an email, transmitting a push notification, sending a text message, or sending a message to an app associated with the user device, the message comprising instructions to generate an alert.

9. The system of claim 1, wherein the account data is associated with at least one of a credit card, a bill pay account, or a debit card.

10. The system of claim 1, wherein generating the linked data structure comprises generating the parameters based on the account data and a rule associated with the issuer system.

11. The system of claim 1, wherein the online address is associated with an authentication system of the issuer system.

12. The system of claim 1, wherein triggering the account allocation comprises updating the enterprise data structure.

13. The system of claim 1, wherein the enterprise data structure comprises a relational database.

14. A method for real-time, online transactional processing, comprising:
    receiving, from an event broker comprising a distributed cloud-computing system, event data comprising a transaction data structure that includes account data;
    generating an ephemeral container instance;
    performing, using the container instance:
        identifying an issuer system associated with the account data based on a comparison of the account data with an enterprise data structure having a normalized schema;
        retrieving an enrollment status of the issuer system from the enterprise data structure;
        retrieving additional data including an identifier of the issuer system and an identifier of a user associated with the account data;
        aggregating, via the event broker, the enrollment status, the identifier of the issuer system and the identifier of the user associated with the account data into an aggregated data structure;

generating, based on the aggregated data structure, a filtered transaction data structure comprising filtered transaction data and tokenized account data;

transmitting, using encryption, the filtered transaction data structure to an analyzer;

receiving, from the analyzer, machine learning model output comprising a result data structure associated with the filtered transaction data structure, wherein the analyzer trains neural network models to generate the result data structure;

generating, based on the result data structure and on user profile data linked to the account data in the enterprise data structure, a linked data structure comprising parameters, the filtered transaction data, an online address, and instructions for generating an interface at a user device, wherein generating the linked data structure further comprises retrieving the parameters based on the identifier of the issuer system and the identifier of the user associated with the account data, wherein the linked data structure comprises multiple nodes and pointers and sets of parameters wherein each node and pointer related to a set of parameters, and wherein the linked data structure comprises instructions for generating an interface at the user device;

routing the linked data structure to a user device of the user, the routing comprising retrieving a destination from the enterprise data structure based on the account data, and transmitting the linked data structure to the destination;

receiving an encrypted communication comprising approval data based on the linked data structure from at least one of the user device or a system associated with the online address; and triggering an account allocation based on the approval data; and triggering an account allocation using the tokenized account data associated with the parameters based on the approval data, the account allocation comprising sending a payment to the issuer system or crediting a balance associated with the issuer system; and after triggering the account allocation, terminating the ephemeral container instance.

15. A method for real-time, online transactional processing, comprising:

receiving an enrollment status of an issuer system;

storing the enrollment status in an enterprise data structure;

receiving, from an event broker comprising a distributed cloud computing system, event data comprising a transaction data structure that includes account data;

generating an ephemeral container instance;

performing, using the container instance:
identifying an issuer system associated with the account data based on a comparison of the account data with the enterprise data structure having a normalized schema;

retrieving an enrollment status of the issuer system from the enterprise data structure;

retrieving additional data including an identifier of the issuer system and an identifier of a user associated with the account data;

aggregating, via the event broker, the enrollment status, the identifier of the issuer system, and the identifier of the user associated with the account data into an aggregated data structure;

generating, based on the aggregated data structure, a filtered transaction data structure comprising filtered transaction data and tokenized account data;

transmitting, using encryption, the filtered transaction data structure to an analyzer;

receiving, from the analyzer, machine learning model output comprising a result data structure associated with the filtered transaction data structure, wherein the analyzer trains neural network models to generate the result data structure;

generating, based on the result data structure and on user profile data linked to the account data in the enterprise data structure, a linked data structure comprising parameters, the filtered transaction data, an online address, and instructions for generating an interface at a user device, wherein generating the linked data structure further comprises retrieving the parameters based on the identifier of the issuer system and the identifier of the user associated with the account data, wherein the linked data structure comprises multiple nodes and pointers and sets of parameters wherein each node and pointer related to a set of parameters, and wherein the linked data structure comprises instructions for generating an interface at the user device;

routing the linked data structure to the user device, the routing comprising retrieving a destination from the enterprise data structure based on the account data, and transmitting the linked data structure to the destination, and the routing further comprising performing at least one of sending an email, transmitting a push notification, sending a text message, or sending a message comprising instructions to generate an alert to an app associated with the user device;

receiving an encrypted communication comprising approval data based on the linked data structure from at least one of the user device or a system associated with the online address; and triggering an account allocation using the tokenized account data associated with the parameters based on the approval data, the account allocation comprising sending a payment to the issuer system or crediting a balance associated with the issuer system; and after triggering the account allocation, terminating the ephemeral container instance.

16. The system of claim 1, wherein generating the linked data structure comprises processing the different sets of parameters simultaneously.

17. The system of claim 1, wherein triggering the account allocation comprises offering the different sets of parameters to the user associated with the account data.

* * * * *